United States Patent [19]

Wittenbreder

[11] 4,227,296
[45] Oct. 14, 1980

[54] TOOL-CHANGING DEVICE

[75] Inventor: Eduard Wittenbreder, Bielefeld, Fed. Rep. of Germany

[73] Assignees: Firma Droop & Rein, Bielefeld; Herr Dipl.-Ing. M. G. Dronsek, Klingen, both of Fed. Rep. of Germany

[21] Appl. No.: 938,872

[22] Filed: Sep. 1, 1978

[30] Foreign Application Priority Data

Sep. 2, 1977 [DE] Fed. Rep. of Germany ....... 2739534

[51] Int. Cl.³ ........................................... B23Q 3/157
[52] U.S. Cl. .................................................... 29/568
[58] Field of Search ............ 29/568; 214/1 BB, 1 BC, 214/1 BD; 414/736, 738, 739, 740, 741, 744 A, 751, 753

[56] References Cited

U.S. PATENT DOCUMENTS

| | | | |
|---|---|---|---|
| 3,566,516 | 3/1971 | Brainard et al. | 29/568 |
| 3,571,912 | 3/1971 | Kielma | 29/568 |
| 3,646,664 | 3/1972 | Vearil et al. | 29/568 |

Primary Examiner—Z. R. Bilinsky
Attorney, Agent, or Firm—Charles E. Baxley

[57] ABSTRACT

A tool-changing apparatus for a multiple-spindle milling machine having a gantry covering a working-part table. Individual working spindles are movable from working positions side by side in unison in a tool-change position laterally from the working-part table. Tool-gripping devices are movable between a delivery station and the working spindles in the tool-change position among which each gripping device is turnable and is arranged in said change position of each of the working spindles. The gripping devices are each arranged at a separate swinging device which is movable at least in a direction of a connecting line of the working spindle or parallel thereto in relation to the swinging devices of other of the tool-gripping devices.

6 Claims, 5 Drawing Figures

TOOL-CHANGING DEVICE

BACKGROUND OF THE INVENTION

This invention relates to a tool-changing apparatus or device for a multiple-spindle milling machine with a gantry covering the working-part table at which the individual working spindles are movable from their working position side by side at the same time in a tool-change position sideways from the working-part table, and with a tool-storage unit arranged on the same side of the working-part table near the milling machine, on which tools or tool-pickup devices to be changed are kept ready at a delivery station, and with tool-gripping devices movable between this delivery station and the working spindles in tool-change position, among which each gripping device is turnable and is arranged in the change position of each of the working spindles.

Such a tool-changing device is known from U.S. Pat. No. 3,571,912. With this known tool-changing device, it was also possible already to change the tools of all working spindles of multiple-spindle milling machines at the same time. For this purpose, the tool-gripping devices which successively remove the tool to be replaced from the working spindle and insert the new tool into the pickup of the working spindle are arranged in a common carrier on which the tool-gripping devices are fixed in the interval of the working spindles.

This arrangement of the tool-gripping devices entails several disadvantages. In the case of large working parts to be worked at the same time, the working spindles have a considerable spacing. The spacings of the tool-gripping devices on the tool-changing device must be of equal size. However, the dimensions of the tool-storage unit, at whose delivery station the tools to be taken or the tool-pickup devices to be kept in readiness must be arranged at the same spacing, are also governed in this way. In the known design, the tool-changing device in delivery position at the tool-storage unit can only remove or deposit tools from the tool-pickup devices simultaneously with all the tool-gripping devices. Consequently, the fact that it is not possible to vary the spacings of the working spindles is a special disadvantage of this known machine.

In order to overcome these disadvantages, the goal of the invention was that of designing a tool-changing device of this type so that as much freedom as possible exists in selecting the tool interval for a plane in the tool-storage unit, which must simultaneously be kept ready at all working spindles for each tool-changing process.

STATEMENT OF INVENTION

This task is solved in accordance with the invention with a tool-changing device of the type mentioned at the outset by arranging each of the tool-gripping devices on a separate swinging device which is movable at least in the direction of the connecting line of the working spindles or is parallel thereto in relation to the swinging devices.

The primary advantage of the invention lies in the fact that, especially in the case of big intervals between the working spindles, the tools simultaneously needed for the tool exchange in a given case can be accommodated side by side in the tool-storage unit at smaller intervals because the distances between these tools in relation to the intervals between the working spindles can be spread over the separate swinging devices.

BRIEF DESCRIPTION OF THE DRAWINGS

Further advantages of the invention can be seen in claims which follow and in the following description. The figures show:

FIG. 2a a top view of the delivery device of the tool-changing device;

DESCRIPTION OF PREFERRED EMBODIMENTS

Figure 1:
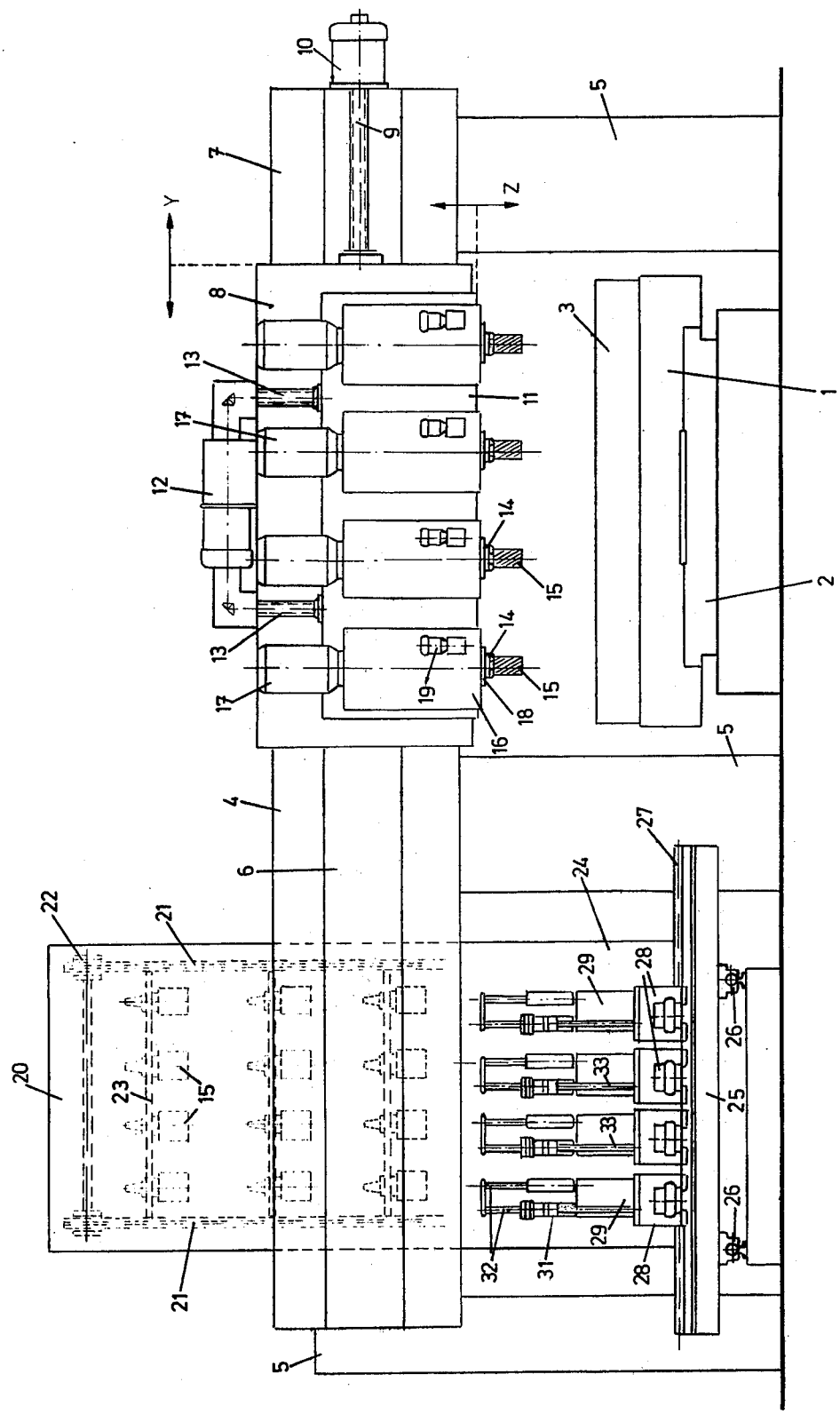
FIG. 1 a front view of a multiple-spindle milling machine with a tool-changing device in accordance with the invention.

FIG. 1 shows the essential design of a multiple-spindle milling machine with a tool-changing device in accordance with the invention. In the preferred embodiment therein represented, a so-called three-way machine is involved, whereby three axes, the X, Y and Z axes, form a three dimensional rectangular coordinate system.

The milling machine thus has working-part table 1 movable in longitudinal direction, i.e., in the direction of the X axis, which is arranged on longitudinal guide 2 in X direction. Working part 3, which is held by a pressure device not shown in detail, is schematically indicated on working-part table 1. The large-surface milling machine is included in the gantry design, and accordingly working-part table 1 is covered in transverse direction by gantry 4 which resets on gantry supports 5 arranged at the side of working-part table 1. Arm 6 with crossrail 7, to which cross slide 8 is fixed, lies on gantry supports 5. Cross slide 8 is movable in the Y direction on crossrail 7, and for this purpose it is driven by Y drive 10 arranged laterally to arm 6 by driving shaft 9.

Vertically movable slide 11, which is movable in the direction of the Z axis, is located on cross slide 8. Z drive 12, which is connected with slide 11 by shaft 13, is located on cross slide 8 for this purpose. Cross slides 8 and slide 11 accordingly form a compound slide for the Y-Z plane.

Working spindles 14 are arranged in this plane aligned in Y direction; each has its own spindle box 16, and they are mounted in common on vertically movable slide 11. The four working spindles 14 present bear four simultaneously movable tools 15, each of which can be adjusted in axial direction on a zero coordinate. Working spindles 14 therefore are designed as movable spindle sleeves 18, which are controlled on the front side of spindle boxes 16 by spindle-sleeve drive 19. Spindle drives 17 necessary for the individual working spindles 14 are also located on the upper side of spindle boxes 16.

The four-spindle design of the milling machine represented is selected only by way of example; it is important for the tool-changing device in accordance with the invention for two or more working spindles 14 to be present, which must be served in case of a tool exchange.

As the tool exchange cannot take place practically above working-part table 1, both for reasons of space and because of fouling, working spindles 14 are movable in a lateral direction on cross slides 8 at least so far from the working area that they can assume an exchange position near working-part table 1. Consequently, gantry 4 of the milling machine is extended at one side of working-part table 1 in order to be able to move all working spindles 14 from the working area. Tool-storage unit 20 is arranged at the same side of the milling machine; it lies in vertical direction beside gantry 4 in the preferred embodiment. According to the design of the tool-changing device, this tool-storage unit 20 can also be arranged outside the range of gantry 4 of the milling machine. It is important for the tool-exchanging device to be able to cover the distance between tool-storage unit 20 and working spindles 14 in change position.

Figure 2:
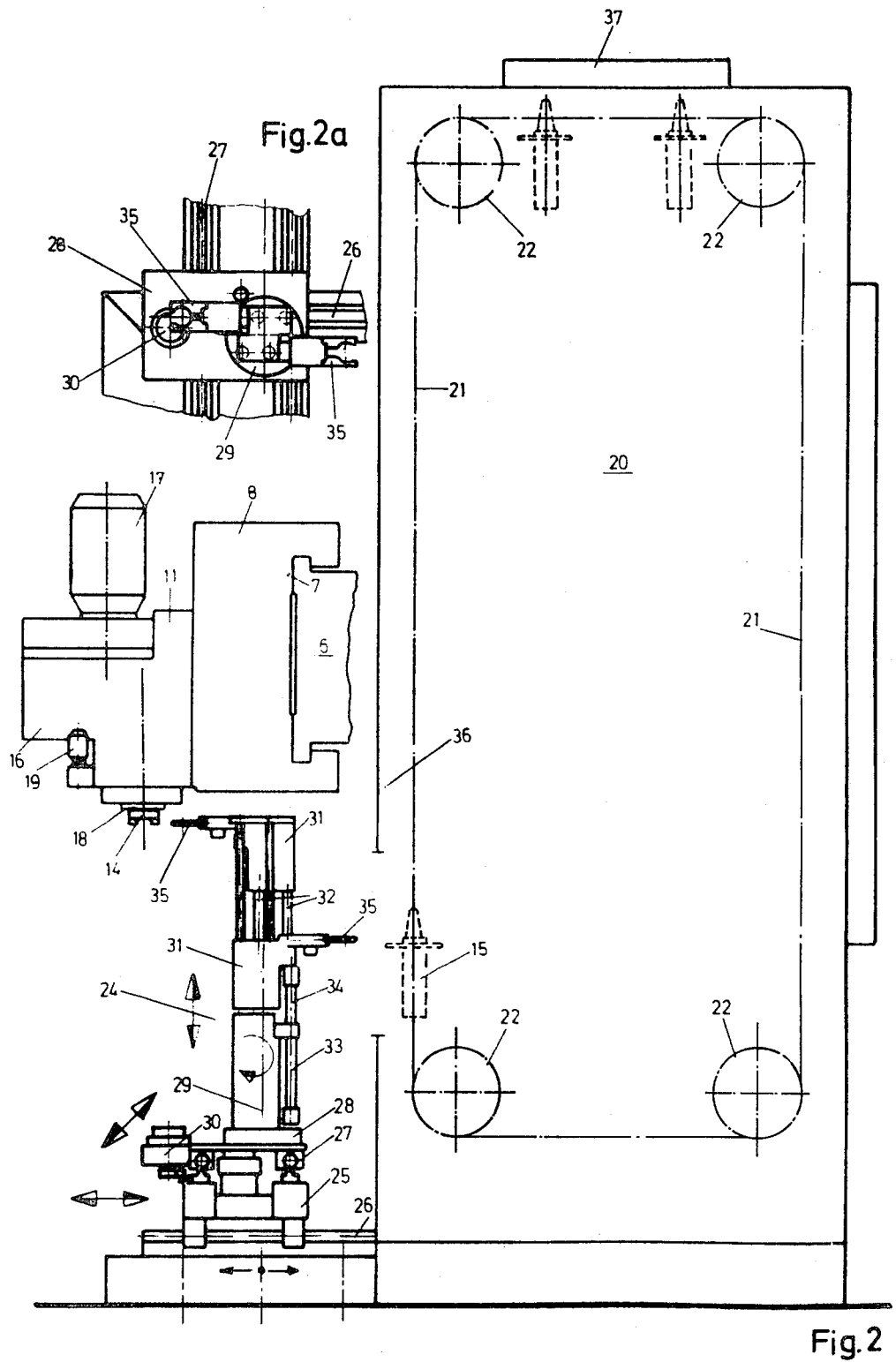
FIG. 2 a sectional side elevation of the milling machine after FIG. 1 with a side view of the new tool-changing device.

Tools 15 are hung up in tool-storage unit 20 in gondola arrangement, for which purpose a pair of chains 21 rotating by means of guide devices 22 are arranged inside tool-storage unit 20. The guiding of chains 21 is presented schematically in FIG. 2. Tools 15 can be removed from this forwarding device by hand or by machine at upper loading and delivery opening 37 of tool-storage unit 20 and again introduced into it, whereas delivery station 36 preferably is provided at the front side of the tool-storage unit for tool-replacement by machine by the tool-changing device in accordance with the invention, at which either tools 15 or suitable tool-pickup devices are kept in readiness according to whether tools 15 are to be taken from tool-storage unit 20 or tools 15 are to be delivered to it. In the execution example, the tool-pickup devices consist of tool palettes 23 suspended between chains 21 of tool-storage unit 20 and on which in all cases tools 15 are kept at an interval which is independent of the distance between working spindles 14. To save space, it is suitable for the interval of tools 15 on tool palettes 23 in tool-storage unit 20 to be considerably smaller than the distance between working spindles 14, which must be unchangeable at least during an entire working process with several tool exchanges. Therefore it is essential for the tool-changing device in accordance with the invention for the variable distance between tools 15 in tool-storage unit 20 and in the pickup of working spindles 14 to be adjusted. This holds true especially when the distance between working spindles 14 is altered for special processing steps or (for example) there is a transfer from four-spindle operation to two- or three-spindle operation with increased distances between working spindles 14 on the same machine.

Tool-delivery device 24, which is arranged on its own cross slide 25 which is fixed on its own crossrail 26, serves for removal from or delivery of tool 15 to tool-storage unit 20 on the one hand and on the other hand from or to working spindles 14 located in exchange position. This crossrail 26 is vertical to arm 6 of the gantry milling machine in the shown embodiment. It is called a crossrail here because it is somewhat shorter than another longitudinal guide 27 located above on cross slide 25 and which bears four individual tool-change slides 28. Longitudinal slide 27 lies parallel to cross slide 7 on arm 6, because of which tool-changing slide 28 is movable on longitudinal slide 27 in the Y direction or in a direction parallel to it. As already has been stated, the individual working spindles 14 or tools 15 picked up on them are aligned one after another in the same direction and are movable simultaneously to prepare for the tool exchange. Tool-exchange slides 28 can be moved on longitudinal slide 27 independently of each other, whereby the distances between them are also changeable. As especially is seen from the side view in FIG. 2, swinging device 29 is located on each of tool-change slides 28, on which the other parts of tool-delivery device 24 are located in all cases. In addition to swinging device 29, swinging drive 30 is located on tool-change slide 28, which is capable of rotating the swinging device together with its superstructural parts around a vertical axis. The swinging angle of swinging device 29 is 180° in the arrangement of tool-storage unit 20 to working spindles 14 located in exchange position in the execution example, but it may also assume other values at different relative positives of tool-storage unit 20 and working spindles 14.

Each of swinging devices 29 bears two tool-gripping-device slides 31 on parallel vertical guides 32, which can be moved side by side in vertical direction independently on each other. FIG. 1 presents the two tool-gripping-device guides 31 of each swinging device 29 represented at the same height, whereas they are shown at different height positions in FIG. 2. Height displacement of tool-gripping device 31 takes place by means of lifting cylinder 33 with piston 34, which are arranged in all cases parallel to vertical guides 32 on swinging device 29.

Each of tool-gripper slides 31 bears tool-gripping device 35 projecting in radial direction at its upper end, in which case commerical tool pliers can be used. The two tool-gripping devices 35, in all cases arranged on two tool-gripper slides on one of swinging devices 29, form a tool-gripping unit at an angle interval of 180° (for example) as one each of working spindles 14 is assigned to the milling machine. This tool-gripping-device pair can remove the tool to be taken away at the working spindle 14 involved of the milling machine and introduce the new tool, whereas the tool taken from the working spindle 14 involved can be given to delivery station 36 of tool-storage unit 20 and a new tool can be taken. In order to adjust the difference in height between the tool pickup of the working spindle 14 involved and delivery station 36 at tool-storage unit 20, both tool grippers 35 of a tool-gripping pair are adjustable for height whereby, in addition to being able to cover the swinging ranges of tool-gripping device 35 at all conceivable positions between the tool-delivery device and the working spindles on the one hand and the tool-delivery device and tool-storage unit 20 on the other without difficulty, both tool-gripping units 35 of each tool-gripping pair can be adjusted in height independently of each other.

Figure 3:
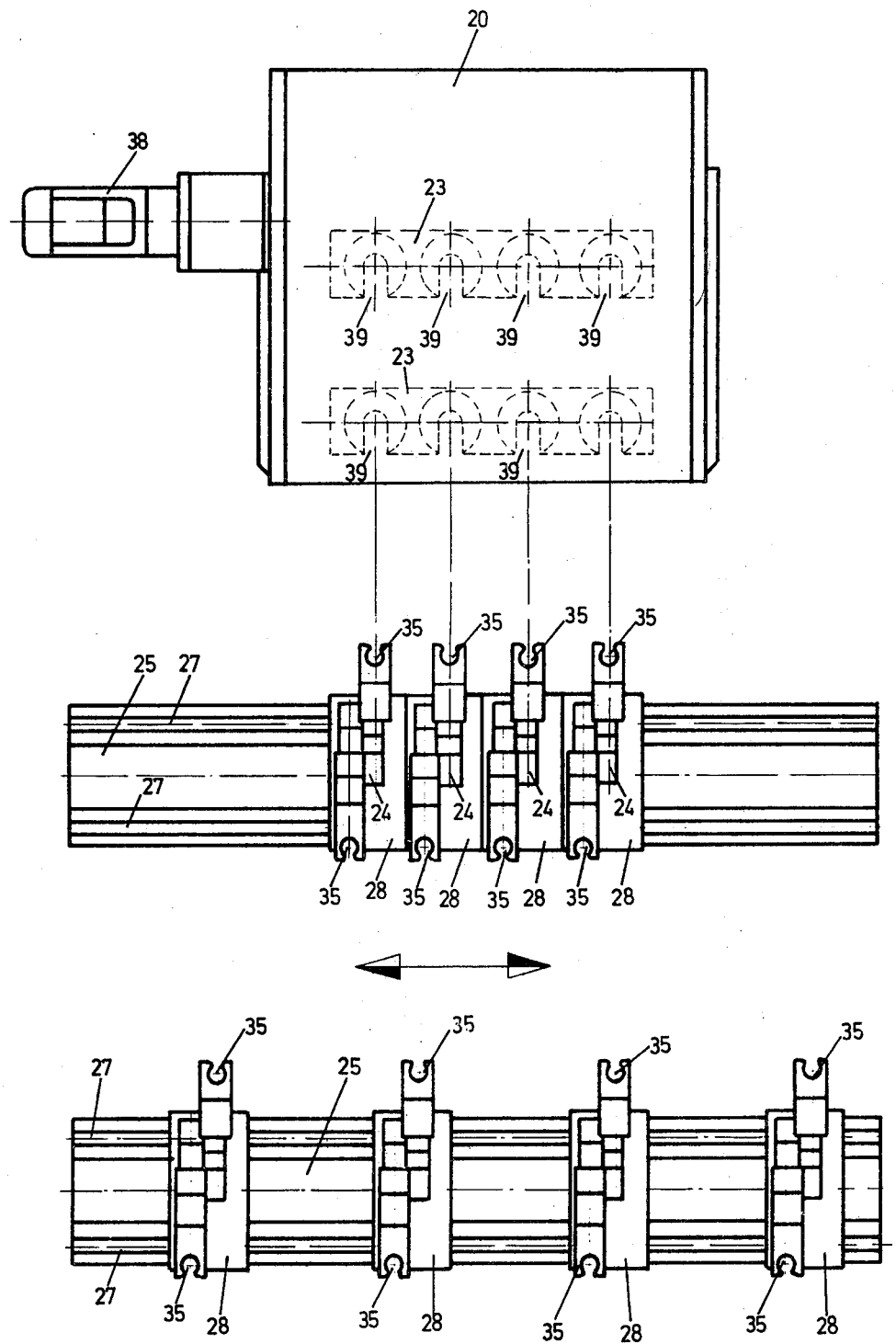
FIG. 3 a schematic top view of a tool-changing device according to the invention with tool-gripping devices collected in a single group at the tool-storage unit, and FIG. 4 a schematic top view of a tool-changing device according to the invention with tool-gripping devices collected at the tool-storage unit in two separate subgroups.

The functional course of tool-delivery device 24 essential for the invention is represented schematically in FIG. 3. This figure shows drive 38 screwed on outside of tool-storage unit 20 for chains 21 not represented further, between which tool palettes 23 are suspended. Corresponding to the number of tools 15 to be arranged on them, these tool palettes have tool-holding devices 39 one beside the other. As a rule, the number of tool-holding devices 39 on one of tool-palettes 23 corresponds to the number of working spindles 14 of the milling machine in order to keep all the tools needed for a tool change ready on the tool palettes at the same time. The functional design according to FIG. 3 accordingly provides that, when a tool delivery to or tool pickup from storage unit 20 takes place, tool-holding devices 39 located side by side on one of tool palettes 23 are simultaneously served by four tool-gripping devices. This means that four of tools 15 are simultaneously delivered to tool-holding device 39 or are taken from there.

In this process, the tool-delivery device is located in a so-called "removal-delivery position" at delivery station 36 of tool-storage unit 20. Cross slides 25 of the tool-delivery device should accordingly be moved on crossrail 26 so far in the direction of tool-storage unit 20 that tool-gripping devices 35 of the tool-gripping pairs located side by side turned to tool-storage unit 20 are in contact with tool-holding devices 39 of tool palette 23.

After that, cross slide 25 returns from tool-storage unit 20, and tool-delivery device 24 reaches a readiness position in which the individual tool-changing slides 28 assume either the unspread position represented in the upper representation in FIG. 3 or the spread position shown in the lower representation in FIG. 3 according to whether a swinging of tool-grippers 35 over swinging devices 29 is necessary or not. The spreading of tool-changing slides 28 on longitudinal glide 27 with establishment of a certain interval between neighboring tool-change slides 28 can result in two ways. On the one hand, place is needed for the swinging process for tool-gripper 35 in order for tool-grippers of adjacent tool-change slides 28 not to collide with each other, and on the other the relatively displaceability of tool-change slide 28 makes it possible to adjust tool-grippers 35 lying side by side to the intervals of working spindles 14 of the milling machine. Independently of the swinging space necessary for tool-gripping devices 35 and also independently of the interval of working spindles 14 of the milling machine, consequently, the intervals of tool-holding devices 39 of tool-palettes 23 can be made as small as is permitted by the minimum distance between tool-gripping devices 35 lying side by side, which is given by the minimum distance between individual tool-change slides 28 on longitudinal guide 27.

Tool-delivery device 24 assumes a third position in the area of working spindles 14 of the milling machine located in change position, namely the change position. In the change position, the intervals of tool-grippers 35 of the tool-change slides are adjusted to the distances of working spindles 14.

Figure 4:
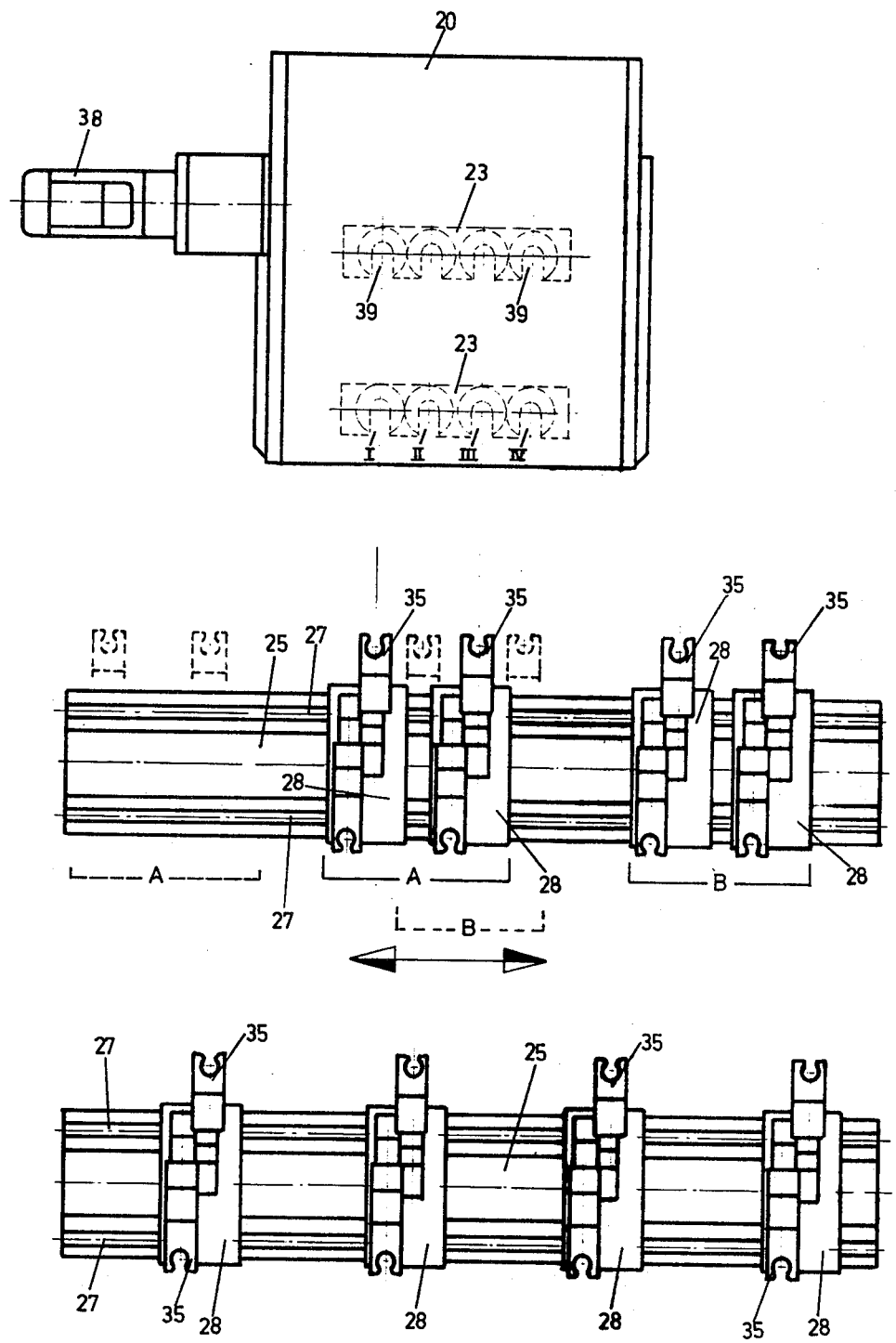

Whereas in the execution example after FIG. 3 the gripper-arm pairs for tool delivery or pickup are collected at delivery station 36 of tool-storage unit 20 into a single change group, in an alternate embodiment according to FIG. 4 they are subdivided into two subgroups, A and B, consisting in each case of two adjacent tool-grippers 35 which are in contact with the tool palette 23 involved at delivery station 36 of tool-storage unit 20 independently of each other in time. The distance of both tool-change slides 28 located in pickup or delivery position as well as their adjacent tool grippers 35 amounts to twice the interval between tool-holding devices 39 of the tool palette 23 involved in tool-storage unit 20. In this function of tool-delivery device 20, it is thus possible to make the interval in tool-holding device 39 smaller than the minimum distance between two adjacent tool-grippers 35 on two adjacent tool-change slides 28.

In the form of execution shown in FIG. 4, both left tool grippers 35 are included in subgroup A, which correspond to tool-holding devices 39 at sites I and III of tool palettes 23, whereas the right two tool grippers 35 from subgroup B are located in parking position outside the contact range of the tool grippers of group A. This can be achieved by suitable displacement of tool-change slides 28 for subgroup B on longitudinal guide 27. Tool grippers of collected subgroup B are suitably arranged for the delivery-removal position of sites II and IV. If subgroup B is in contact with the tool-storage unit, subgroup A is moved into a parking position on longitudinal guide 27 laterally to tool-storage unit 20, as is indicated by the broken representation.

The lower representation in FIG. 4 also shows how tool grippers 35 can again be spread by divergence of tool-change slides 28 after leaving the delivery-removal position or the parking position.

In case of a two-spindle operation of the four-spindle milling machine, for example, work takes place with only two of the four tool grippers, whereby the unnecessary tool grippers are moved on their tool-change slides into the outside parking position and are diverted from the working spindles. For tool exchange, two of any of sites I to IV of the tool-holding device are available at the tool-palettes in the tool-storage unit because any arrangement of tools next to each other is attainable due to the distance interchangeability.

In the course of functioning and with a suitable design of the tool-storage unit according to FIG. 3, simultaneous tool delivery or pickup in delivery-removal position of the tool-gripping device is the salient feature, whereas in the design according to FIG. 4 the spatial advantage of tool-storage unit 20 predominates.

It will be understood by those familiar with the art to which this invention pertains most closely that various deviations may be made from the embodiments described in the foregoing description without departing from a main theme of invention set forth in claims which follow.

I claim:

1. A tool-changing apparatus for a multiple-spindle milling machine having a workpiece table comprising, a gantry which extends across the workpiece table and on which the individual working spindles are movable side by side together from working positions to a tool change position that is lateral to the workpiece table, a tool-storage unit comprising a plurality of parallel tool pickup devices, each device adapted to hold a tool and a delivery station at which tools are presented to be exchanged arranged on the same side of the workpiece table near the milling machine, whereby said tool-pickup devices are separated from each other by intervals that are smaller than the intervals between said working spindles, a delivery station as part of said tool-storage unit, tool gripping devices movable between said delivery station and the working spindles in the tool-change position each gripping device being turnable and arranged in said tool-change position of each of the working spindles, and separate swinging devices for supporting each of said tool gripping devices, said swinging device being movable relative to one another for changing the distance therebetween, said swinging devices supporting the tool gripping devices which tool gripping devices move at least in the direction of the working spindles.

2. The tool-changing apparatus in accordance with claim 1, wherein said swinging devices, are further arranged to comprise a side by side orientation, and a common longitudinal guide lying to comprise a parallel to the direction of the connecting line of the working spindles on which said swinging devices are arranged.

3. The tool-changing apparatus in accordance with claim 2, further characterized in that the common longitudinal guide for the swing devices further comprises a crossrail that is vertical relative to the longitudinal guide and is fixed thereto.

4. The tool-changing apparatus in accordance with claim 3, wherein said tool-gripping devices each further comprise a respective tool gripper, means on said tool gripping devices for vertically adjusting the respective tool-grippers independently of any other of said tool-grippers, a slide on said common longitudinal guide for supporting said swinging devices thereupon.

5. The tool-changing device in accordance with claim 2, further characterized in that some of the swinging devices being movable as a first group to and from said delivery station and the balance of the swinging devices forming another group that is movable to and from said delivery station separately from said first group of swinging devices, among which each of the groups are turnable independently in delivery-removal position at said delivery station.

6. The tool-changing device in accordance with claim 5, characterized further by the fact that adjacent of the swinging devices in each of said groups are arranged to alternately align with said delivery stations.

* * * * *